United States Patent

Naganuma et al.

[15] 3,706,984

[45] Dec. 19, 1972

[54] CODE TRANSLATION DEVICE

[72] Inventors: Masaaki Naganuma; Kazuyoshi Saito, Minato-ku, Tokyo, Japan

[73] Assignee: Nippon Electric Company, Limited, Tokyo, Japan

[22] Filed: Sept. 16, 1970

[21] Appl. No.: 72,611

[30] Foreign Application Priority Data

Sept. 20, 1969 Japan ....................................44/74999

[52] U.S. Cl. ...............................340/347 DD, 340/365
[51] Int. Cl. ...............................................G06f 3/02
[58] Field of Search ......340/365, 347 DD; 178/17 C, 178/101–103

[56] References Cited

UNITED STATES PATENTS

| | | | |
|---|---|---|---|
| 3,091,700 | 5/1963 | Harper | 340/365 X |
| 3,119,996 | 1/1964 | Comstock | 340/365 |
| 3,035,253 | 5/1962 | Devol | 340/365 X |
| 2,997,703 | 8/1961 | Powell | 340/365 X |
| 3,261,914 | 7/1966 | Evans, Jr. | 340/365 X |
| 3,363,737 | 1/1968 | Wada et al | 340/365 X |

*Primary Examiner*—Charles D. Miller
*Attorney*—Marn & Jangarathis

[57] ABSTRACT

A code translation device for translating an information character into a binary signal, comprising a drive circuit for supplying current to an exciting coil wound on a magnetic core, and variable impedance means varying the amount of drive current supplied to the exciting coil and including a control coil wound on a second magnetic core to constitute high impedance to limit the amount of drive current supplied to the exciting coil to a small amount to provide four parallel O output signals to indicate an idle state at one time and thereafter to constitute a low impedance to increase the amount of drive current supplied to the exciting current to provide four parallel 1 and 0 output signals to represent a preselected information character at another time.

9 Claims, 4 Drawing Figures

PATENTED DEC 19 1972

3,706,984

INVENTORS
Masaaki Naganuma
Kazuyoshi Saito

BY

Marn & Jangarathis

ATTORNEYS

CODE TRANSLATION DEVICE

This invention relates to an improved code translation device for producing information signals suitable for use with character display devices or the like and transmitted as binary signals to an electronic computer.

When information (for example, A) is fed to the computer, one of the keys designated as A on a keyboard is operated, then the information A is converted into a binary signal by the code translation device and transmitted to the computer. One of the known code translation devices of this type comprises: a plurality of ferrite cores with exciting coils; permanent magnets equal in number to the ferrite cores and having sufficient magnetic energy to saturate magnetically the ferrite cores; a plurality of sensing coils; sensing elements connected to the sensing coils respectively; a key shaft for moving the permanent magnets; key tops connected to the key shaft and operated by an operator; and a drive circuit connected to the exciting coils and operated to excite the ferrite cores. This conventional device, however, has several disadvantages. For example, the output voltage varies in magnitude in response to mechanical damage in the permanent magnet and ferrite core due to contact therebetween. Furthermore, exciting current is caused to flow in the exciting coils, idle operation wherein no key top is depressed. As a result, power consumption is unnecessarily high.

It is an object of this invention to provide an improved code translation device in which an element capable of taking on two different impedance values is connected in series with each exciting coil so that the code translation circuit may be controlled in response to the two different impedance values of the element.

The code translation device of this invention comprises: a ferrite core having a closed magnetic circuit; sensing extending through and crossing the ferrite core; sensing element connected in series with the sensing coils; an exciting coil wound on the ferrite core; a control coil connected in series with the exciting coil and provided with a moving core; and a drive circuit driving the exciting coil by the control coil; wherein the movement in the moving core enables the control coil to establish either one of the two different impedance values of which one is larger and the other smaller than that of the exciting coil. According to another feature of the invention, there is provided a code translation device comprising: a first ferrite core having a closed magnetic circuit; sensing coils extending through and crossing the first ferrite core; sensing elements connected in series with the sensing coil; an exciting coil wound on the first ferrite core; a control part provided with a second ferrite core having a closed magnetic circuit, a control coil wound on the second ferrite core and connected in series with the exciting coil, and a permanent magnet controlling the magnetic saturation of the second ferrite core; and a drive circuit driving the exciting coil via the control coil; wherein the change in the spatial distance between the permanent magnet and the second ferrite core enables the control coil to establish either one of the two different impedance of which one is larger and the other smaller than that of the exciting coil.

The invention will be more fully understood from the following detailed description in conjunction with the accompanying drawings, wherein.

Figure 1:
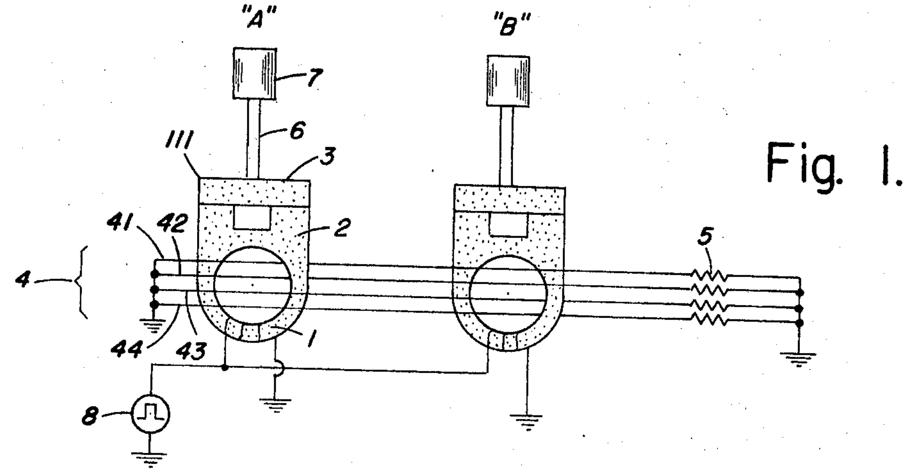
FIG. 1 is a schematic diagram showing the principle of a conventional code translation device.

Referring to FIG. 1, one conventional translation device comprises a ferrite core 2 provided with an exciting coil 1; a permanent magnet 3 having sufficient magneto-motive force to magnetically saturate the ferrite core 2; a plurality of sensing coils 4; a plurality of sensing elements 5 connected to the sensing coils 4 respectively; a key shaft 6 for moving the permanent magnet 3; a key top 7 connected to the key shaft 6 and operated by an operator; and a drive circuit 8 connected to the exciting coils 1 and operated to excite the ferrite cores 2.

When the ferrite core 2 is in close contact with the permanent magnet 3, the ferrite core 2 is magnetically saturated by the permanent magnet 3. As a result, the magnetic coupling between the exciting coil and the sensing coil becomes very weak and only very low voltage is generated across the sensing elements 5. When the ferrite core 2 is not in contact with the permanent magnet 3, the ferrite core is not magnetically saturated and, as a result, the magnetic coupling between the exciting coil and the sensing coil becomes so strong that a high voltage is generated across the sensing elements 5. As regards the key A in FIG. 1, the sensing coils 41 and 42 are extended through the ferrite core 2, but the sensing coils 43 and 44 cross over the core 2. Therefore, the sensing coils 41 and 42 form 1, and 43 and 44 form 0. Whereas, in the idle state where the permanent magnet 3 is in close contact with the ferrite core 2, the sensing coils 41 and 42 also form 0 because of the aforementioned principle and, when the key is operated, namely when the permanent magnet is not in contact with the ferrite core, the sensing coils 41 and 42 become 1. Thus, by operating the key a, parallel code translation of 1, 1, 0, 0 is performed therefor in the order of the sensing coils 41, 42, 43 and 44 is done. This device has several disadvantages. For example, the output voltage is easily affected by a structural secular change of the permanent magnet 3; the permanent magnet and ferrite core suffer structural damage due to mechanical contact therebetween; the exciting current flows in the exciting coil under the idle operating state where no key top is depressed, with a result that power consumption in the exciting coil is unnecessarily high.

Figure 2:
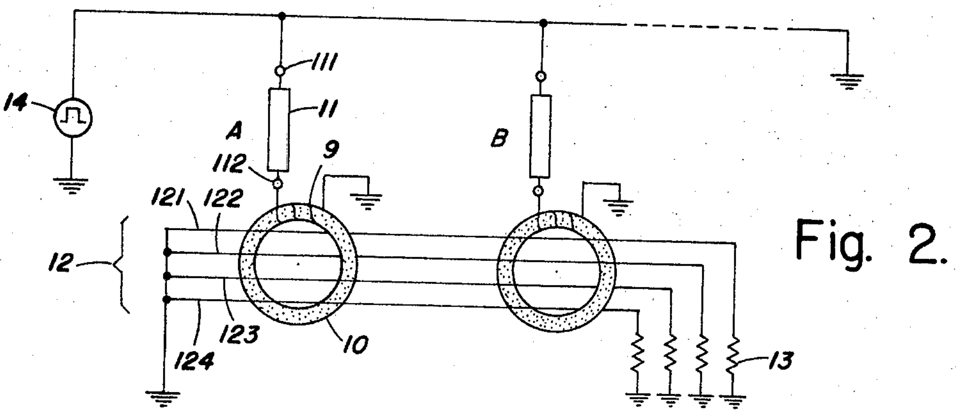
FIG. 2 is a circuit diagram showing a code translation device embodying this invention.
Figure 3A:
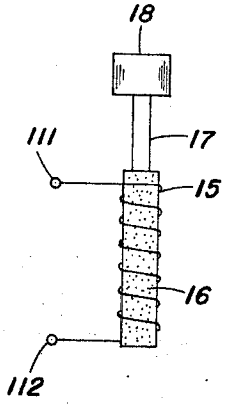
FIGS. 3(*a*) and (*b*) illustrate different structural forms of control parts used in the code translation device shown in FIG. 2.
Figure 3B:
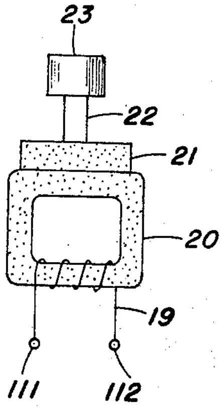

Referring to FIG. 2 which shows a circuit diagram of a code translation device embodying this invention and to FIGS. 3(*a*) and (*b*) which illustrate the control part of the device shown in FIG. 2, the code translation device comprises: a ferrite core 10 having an exciting coils 9 would thereon; control part 11a connected in series with the exciting coil 9; a plurality of sensing coils 12 (in this embodiment, 121 through 124); sensing elements 13 connected in series with the sensing coils respectively; and a drive circuit 14 for exciting the ferrite core 10. In control part a in FIG. 3(*a*), the reference numeral 15 denotes a control coil; 16, a rod-shaped core; 17, a key shaft connected to the core 16; and 18, a key top to be operated by operator. In control part B in FIG. 3(*b*), the reference 19 denotes a coil provided for a ferrite core 20, 21 a permanent magnet having magnetic energy to sufficiently saturate the ferrite core 20 magnetically, and 22 a key shaft for connecting the permanent magnet 21 with a key top 23.

The operation of the invention in FIGS. 2 and 3(*a*) and (*b*) is explained below. In FIG. 3(*a*), the impedance between both terminals 111 and 112 of the coil 15 is far greater when the rod-shaped core 16 is disposed in the coil 15 than when the core 16 is disposed outside the coil 15. It is so arranged that this large impedance is made much larger than that of the exciting coil 9 in FIG. 2, and that the small impedance is made smaller than that of the exciting coil 9 in FIG. 2. According to this arrangement, two different impedance values seen from the terminals 111 and 112 of the coil 15 can be formed by changing the coupling degree between the coil 15 and the core 16 either by moving the coil 15 or the core 16. In FIG. 3(*b*), when the ferrite core 20 is in close contact with the permanent magnet 21, the ferrite core is magnetically saturated by the permanent magnet 21 and, accordingly, the impedance seen from the terminals 111 and 112 of the control coil 19 is substantially equal to zero. Whereas, when the ferrite core 20 is not in contact with the permanent magnet 21, the ferrite core is not saturated and, therefore, the impedance seen from the terminals 111 and 112 of the coil 19 becomes a comparatively large value. In this manner, two different impedances seen from terminals 111 and 112 of the coil 19 can be formed depending on whether or not the ferrite core is saturated by the permanent magnet. As to the control part 11 in FIG. 2, any element may be used therefor if only such element is capable of establishing two distinctly different values of impedance as illustrated by referring to FIGS. 3(*a*) and (*b*).

Referring further to FIG. 2, the operation of the invention will more specifically be explained. A drive voltage is always applied to the control circuit 11 form the drive part 14. In the idle operating state, the control part 11 has a large impedance as has been described. This impedance is set to be larger than that seen from the exciting coil 9. As a result, voltage is not virtually applied across the coil 9 and, therefore, the voltage produced across the sensing coil 12 by the magnetic coupling between the coil 9 and the sensing coils 12 (namely, the voltage produced across the sensing elements 13) is very small. On the contrary, when the control part 11 is operated and the impedance value of this control part is small, most of the voltage of the drive circuit 14 is applied across the exciting coil 9, and a voltage is produced across the sensing elements 13 by the magnetic coupling between the coil 9 and the sensing coil 12. By operating the control part 11 in this manner, parallel binary information of 1, 1, 0, 0 can be obtained in the sensing coils 121, 122, 123 and 124 to represent, for example, A in FIG. 2.

The invention, as has been described above, has several technical advantages. For example, the invention has no contact or no mechanically frictional part. Also, the impedance of the control part 11 is large under the idle operating state, to allow no current flow therein. Thus, the driving power consumption is reduced.

IN the embodiment, a semi-fixed memory device of multiple sensing coil type is used for the code translation device. Needless to say, however, the invention is applicable to the multiple exciting coil type semi-fixed memory device.

What is claimed is:

1. A device for translating an information character into a binary signal comprising:

an unsaturable ferrite core having a closed magnetic circuit;

an exciting coil wound on a portion of said core;

a drive circuit providing alternating current having a predetermined frequency for energizing said coil;

a plurality of signal sensing coils disposed on other core portions from said one core portion in such manner that at least one sensing coil passes through said core and at least another sensing coil passes thereover for indicating said binary signal; said one sensing coil being magnetically coupled to said exciting coil to effect a transformer action therebetween;

a plurality of signal sensing elements connected to said sensing coils to form a plurality of closed circuits, each including one of said one and another sensing coils and one of said sensing elements;

key means actuable to select said character for translation into said binary signal; and variable magnetic impedance means connected between said driving circuit and said exciting coil for controlling the amount of current flow in a path including said exciting coil, said impedance means and said driving circuit; said key means joined to said impedance means and actuable for varying the degree of magnetization in said impedance means to vary the impedance value thereof to control correspondingly the amount of current flow in said exciting coil in said path and thereby the degree of magnetic coupling between said exciting and sensing coils to form a binary signal representing said selected character in said sensing elements.

2. The device according to claim 1 in which said impedance means comprises a second magnetic core and a further coil disposed externally of said second core to permit movement of said second core relative to said further coil; said further coil connected in said path with said exciting coil and said driving circuit; said key means joined to said second core and actuable for disposing said second core inside and outside said further coil to vary the degree of magnetization of said impedance means and thereby the effective impedance value thereof.

3. The device according to claim 1 in which said impedance means comprises a second magnetic core having a closed magnetic circuit, a further coil wound on said second core and connected in said path with said exciting coil and said driving circuit, and a permanent magnet; said key means joined to said magnet and actuable for moving said magnet to disengage and engage said second core to vary the degree of magnetization of said impedance means and thereby the effective impedance value thereof.

4. A device for translating an information character into a binary signal, comprising:

an unsaturable ferrite core having a closed magnetic circuit;

an exciting coil wound on one portion of said core;
a driving circuit for providing alternating current to energize said coil;
a plurality of signal sensing coils disposed on other portions of said core in spaced relation relative to said one core portion in such manner that at least a first two sensing coils pass through said core while at least a second two sensing coils pass over said core for indicating said binary signal; said first two sensing coils being magnetically coupled to said exciting coil to effect a transformer action therebetween;
a plurality of signal sensing elements connected to said sensing coils to form a plurality of closed circuits, each including one of said first and second sensing coils and one of said sensing elements;
key means actuable to select said character for translation into said binary signal; and
variable magnetic impedance means comprising a second magnetic core and a further coil disposed externally of said second core to permit movement of said second core relative to said further coil which is connected in a current path also including said exciting coil and said driving circuit; said key means joined to said second core and actuable for disposing said second core inside and outside said further coil to vary the degree of magnetization of said impedance means to vary the effective impedance thereof to vary correspondingly the amount of current flow in said exciting coil in said path and thereby the degree of magnetic coupling between said exciting coil and said first two sensing coils to form a binary signal representing said selected character in said sensing elements.

5. A device for translating an information character into a binary signal, comprising:
an unsaturated ferrite core having a closed magnetic circuit;
an exciting coil wound on one portion of said core;
a driving circuit for providing alternating current to energize said coil;
A plurality of signal sensing coils disposed on other portions of said core in spaced relation relative to said one core portions in such manner that at least a first two sensing coils pass through said core while at least a second two sensing coils pass over said core for indicating said binary signal; said first two sensing coils being magnetically coupled to said exciting coil to effect transformer action therebetween;
a plurality of signal sensing elements connected to said sensing coils to form a plurality of closed circuits, each including one of said first and second sensing coils and one of said sensing elements;
key means actuable to select said character for translation into said binary signal; and
variable magnetic impedance means comprising a second magnetic core having a closed magnetic circuit, a further coil wound on said second core and connected in a current path also including said exciting coil and said driving circuit, and a permanent magnet; said key means joined to said magnet and actuable for moving said magnet to disengage and engage said second core for varying the degree of magnetization in said impedance means to vary the effective impedance thereof to vary correspondingly the amount of current flow in said exciting coil in said path and thereby the degree of magnetic coupling between said exciting coil and said first two sensing coils to form a binary signal representing said selected character in said sensing elements.

6. A device for translating a plurality of different information characters into preselected different binary signals, comprising:
a plurality of unsaturable ferrite cores, each having a closed magnetic circuit;
a plurality of exciting coils, each wound on one portion of one of said cores;
a driving circuit for providing alternating current to energize said coils;
a plurality of sensing coils disposed on other portions of said respective cores in spaced relation relative to said exciting coils thereon in such manner that a first two sensing coils pass through a first of said cores while a second two sensing coils pass over said first core and also that said first two sensing coils pass over a second of said cores while said second two sensing coils pass through said second core; said first two sensing coils being coupled to said exciting coils on said respective first and second cores to effect transformer action between said last-mentioned sensing coils and corresponding exciting coils;
a plurality of signal sensing elements connected to said plurality of sensing coils to form a plurality of closed circuits, each including one of said first and second sensing coils and one of said sensing elements;
a plurality of key means actuable in turn for selecting said characters one at a time for translation into corresponding binary signals; and
a plurality of variable magnetic impedance means connected between said driving circuit and said exciting coils for controlling the amounts of current flow in a first current path including said driving circuit, a first of said impedance means and a first of said exciting coils and in a second current path including said driving circuit, a second of said impedance means and a second of said exciting coils, respectively; each of said key means joined to one of said impedance means; said key means actuable in turn for varying the degree of magnetization in said respective impedance means and thereby the effective impedance thereof to vary correspondingly the amounts of current flow in said exciting coils in respective corresponding current paths and thereby the degree of magnetic coupling between said exciting coils in said corresponding paths and said sensing coils coupled to said last-mentioned exciting coils to form binary signals representing said characters one at a time as selected by said key means in turn in said sensing elements.

7. The device according to claim 6 in which each of said impedance means includes an additional magnetic core joined to one of said key means and a further coil disposed externally of said additional core to enable said additional core to move relative to said further coil; said further coil connected to said driving circuit and said exciting coil in one of said current paths; said one key means actuable to dispose said additional core inside and outside said further coil to vary the degree of magnetization of each said impedance means and thereby the effective impedance thereof.

8. The device according to claim 6 in which each of said impedance means includes an additional magnetic core having a closed magnetic circuit, a further coil wound on said additional core and connected to said driving circuit and said exciting coil in one of said current paths, and a permanent magnet; one of said key means joined to said magnet and actuable for moving said magnet to disengage and engage said additional core to vary the degree of magnetization of each said impedance means and thereby the effective impedance thereof.

9. The device according to claim 6 in which a first of said impedance means includes a first additional magnetic core joined to a first of said key means and a first further coil disposed externally of said first additional core to enable said first additional core to move relative to said first further coil which is connected to said driving circuit and said exciting circuit in said first current path; said first key means actuable for disposing said first additional core inside and outside said first further coil to vary the degree of magnetization of said first impedance means and thereby to vary the effective impedance thereof; and a second of said impedance means includes a second additional magnet core having a closed magnetic circuit, a second further coil wound on said second additional core and connected to said driving circuit and said exciting coil on said second current path, and a permanent magnet; a second of said key means joined to said magnet and actuable for moving said magnet to disengage and engage said second additional core to vary the degree of magnetization of said second impedance means and thereby the effective impedance thereof.

* * * * *